(12) United States Patent
Shinohara et al.

(10) Patent No.: US 7,802,468 B2
(45) Date of Patent: Sep. 28, 2010

(54) PRESSURE SENSOR FOR VEHICLE AND BRAKE FLUID PRESSURE CONTROL APPARATUS FOR VEHICLE

(75) Inventors: Tatsuya Shinohara, Nagano (JP); Masahiko Nakano, Nagano (JP); Atsushi Imai, Tokyo (JP); Yoshihiro Tomomatsu, Tokyo (JP)

(73) Assignees: Nissin Kogyo Co., Ltd., Nagano (JP); Nagano Keiki Co., Ltd., Tokyo (JP)

( * ) Notice: Subject to any disclaimer, the term of this patent is extended or adjusted under 35 U.S.C. 154(b) by 280 days.

(21) Appl. No.: 12/228,160

(22) Filed: Aug. 8, 2008

(65) Prior Publication Data
US 2009/0038388 A1    Feb. 12, 2009

(30) Foreign Application Priority Data
Aug. 10, 2007    (JP)    ............... 2007-209160

(51) Int. Cl.
*G01M 17/00*    (2006.01)
(52) U.S. Cl. ........................................... 73/121
(58) Field of Classification Search .................. 73/121, 73/128, 129
See application file for complete search history.

(56) References Cited

U.S. PATENT DOCUMENTS

| | | | |
|---|---|---|---|
| 6,374,679 B1 * | 4/2002 | Babala et al. ................. 73/715 |
| 6,584,851 B2 * | 7/2003 | Yamagishi et al. ............ 73/715 |
| 6,619,132 B2 * | 9/2003 | Imai et al. ..................... 73/753 |
| 6,789,415 B1 | 9/2004 | Kaiser et al. |
| 2002/0062697 A1 * | 5/2002 | Yamagishi et al. ............ 73/715 |
| 2002/0157474 A1 * | 10/2002 | Babala et al. ................. 73/753 |
| 2004/0262987 A9 * | 12/2004 | McCurdy et al. .............. 303/11 |

FOREIGN PATENT DOCUMENTS

| | | |
|---|---|---|
| JP | 08-236227 | 9/1996 |
| JP | 2002-542107 T | 12/2002 |
| JP | 2003-111724 | 4/2003 |

\* cited by examiner

*Primary Examiner*—Eric S McCall
(74) *Attorney, Agent, or Firm*—Carrier, Blackman & Associates P.C.; Joseph P. Carrier; William D. Blackman

(57) ABSTRACT

Disclosed is a pressure sensor 1 for a vehicle including a sensing element 10 for measuring the pressure of brake fluids in fluid passages, a sensor housing 20 for accommodating the sensing element 10, and contact probes 30 that are electrically connected to the sensing element 10 and an electronic control unit 300 (control unit). Each contact probe 30 includes a sleeve 31, a coil spring 32 (elastic member) housed in the sleeve 31, the rod 33 inserted into the sleeve 31. The sleeve 31 is connected to the sensing element 10 in a state that the sleeve 31 is fixed in the sensor housing 20, and the rod 33 is pressed to the electronic unit 300 by pressing force of the coil spring 32.

9 Claims, 7 Drawing Sheets

BOTTOM ← TOP →

PRESSURE SENSOR FOR VEHICLE AND BRAKE FLUID PRESSURE CONTROL APPARATUS FOR VEHICLE

CROSS REFERENCE TO RELATED APPLICATIONS

This application claims the foreign priority benefit under 35 U.S.C. §119 of Japanese Patent Application No. 2007-209160 filed on Aug. 10, 2007, the disclosure of which is incorporated herein by reference.

BACKGROUND OF THE INVENTION

1. Field of the Invention

The present invention is related to a pressure sensor for a vehicle and a brake fluid pressure control apparatus for a vehicle equipped with the pressure sensor.

2. Description of the Related Art

In a brake fluid pressure control apparatus for a vehicle that controls the brake fluid pressure applied to vehicle brakes, an electronic control unit controls various parts provided in fluid passages based on the pressure of brake fluid measured by a pressure sensor.

A conventional pressure sensor includes a sensing element 10 for measuring the pressure of brake fluid in fluid passages, a sensor housing 20 for accommodating the sensing element 10 and a contact probe 630 that is electrically connected to the sensing element 10 at one end thereof and is electrically connected to the electronic control unit 300 at the other end thereof (disclosed in unexamined Japanese patent application publication No. 2002-542107, paragraphs 0015 and 0016, and FIG. 1).

The conventional contact probe 630 includes a sleeve 631, a coil spring 632 housed in the sleeve 631, a rod 633 inserted into the sleeve 631. The sleeve 631 and the rod 633 are pressed by the pressing force of the coil spring 632 in the direction of their elongation.

The contact probe 630 is slidably inserted into an insertion hole 22c formed at a top end part of the sensor housing 20. The sleeve 631 and the rod 633 are elongated by the pressing force of the coil spring 632 so that the rod 633 is pressed to a connection part 11a of the sensing element 10 and the sleeve 631 is pressed to a connection part 302 of the electronic control unit 300.

In the contact probe 630, the sleeve 631 is pressed to the connection part 302 of the electronic control unit 300, whereby the contact probe 630 and the electronic control unit 300 are electrically connected. In this configuration, because the contact probe 630 is not fixed to the electronic control unit 300, the pressure sensor and the electronic control unit 300 can be easily connected or disconnected.

In the conventional pressure sensor, because the contact probe 630 is slidably disposed in the insertion hole 22c of the sensor housing 20 and the position of the contact probe 630 is not securely fixed, contamination, which is adhesion of dust between the sensing element 10 and the contact probe 630, may be caused by the influences of environment around the sensing element 10 or the sliding of the contact probe 630, which causes a problem that it is difficult to improve the reliability of the connection in the long term.

In the conventional pressure sensor, the rod 633 is pressed to the connection part 11a of the sensing element 10 and the sleeve 631 is pressed to the connection part 302 of the electronic control unit 300. Thus, the electrical connections at both ends of the contact probe 630 are contact connection, which causes a problem that the contact resistance is increased.

There has been another problem that positioning of the contact probe 630 in the sensor housing 20 is difficult because the contact probe 630 is slidable in the insertion hole 22c of the sensor housing 20.

SUMMARY OF THE INVENTION

The present invention is made in view of the above problems and an object thereof is to provide a pressure sensor for a vehicle that enables to improve the reliability of the connection of a contact probe and a sensing element, to prevent the electrical contact resistance of the contact probe from being increased, to easily position the contact probe in a sensor housing when assembling the contact probe in the sensor housing and improve workability of assembling the contact probe into the sensor housing, and a brake fluid pressure control apparatus for a vehicle equipped with the pressure sensor.

First aspect of the present invention provides a pressure sensor for a vehicle including a sensing element for measuring a pressure of fluid in a fluid passage, a sensor housing for accommodating the sensing element, and a contact probe that is electrically connected to the sensing element at one end thereof and is electrically connected to a control unit that is disposed outside of the sensor housing at the other end thereof, the contact probe including a sleeve, an elastic member that is housed in the sleeve, and a rod that is inserted in the sleeve, wherein either one of the rod and the sleeve contacts with a connection part of the sensing element in a state that the either one of the rod and the sleeve is fixed in the sensor housing, and the other one of the rod and the sleeve is pressed to a connection part of the control unit by pressing force of the elastic member.

In the above configuration, because the sleeve or the rod connected to the sensing element is stably fixed to the sensor housing, it is possible to prevent contamination from being generated between the contact probe and the sensing element that may be caused by influence of the environment around the pressure sensor or the slide of the contact probe, which allows to improve the reliability of the connection in the long term.

Furthermore, because the sleeve or the rod is stably connected to the sensing element, the electrical contact resistance between the contact probe and the sensing element can be prevented from being increased.

Moreover, because the sleeve or the rod connected to the sensing element is stably fixed to the sensor housing, the position of the contact probe can be easily determined when assembling the contact probe into the sensor housing. Thus, workability of assembling the contact probe into the sensor housing can be improved, which achieves low production cost of the pressure sensor.

In the aforementioned pressure sensor for the vehicle, the sleeve may be connected to the sensing element and the rod may be connected to the control unit, and the sleeve may be press-fit into an insertion hole formed in the sensor housing.

In the above configuration, the sleeve is press-fit into the insertion hole of the sensor housing, which allows to fix the contact probe in the sensor housing easily.

In the aforementioned pressure sensor for the vehicle, the sleeve may be a closed-end cylinder and may include a diameter shrunk portion formed at an opening edge of the sleeve to prevent the rod from slipping off, and the sensor housing may include a wall portion that surrounds the diameter shrunk portion.

When the diameter shrunk portion is formed at the opening edge of the sleeve, because the distance between the inner circumferential surface of the diameter shrunk portion and the circumferential surface of the rod becomes small, a slight change of the shape of the diameter shrunk portion causes the diameter shrunk portion to come in contact with the rod. In the above configuration, because the wall portion surrounding the diameter shrunk portion of the sleeve is formed, an external member hardly comes into contact with the diameter shrunk portion when handling the pressure sensor, whereby the contact probe can be prevented from being damaged, which results in easy handling of the pressure sensor.

In the aforementioned pressure sensor for the vehicle, the rod may be connected to the sensing element and the sleeve may be connected to the control unit, and the rod may be press-fit into an insertion hole formed in the sensor housing and the sleeve may be slidably inserted into the insertion hole.

In the above configuration, the rod is press-fit into the insertion hole of the sensor housing, which allows to fix the contact probe in the sensor housing easily.

In the aforementioned pressure sensor for the vehicle, the sleeve and the sensing element may be connected in a state that the sleeve and the sensing element are fixed.

In the aforementioned pressure sensor for the vehicle, the rod and the sensing element may be connected in a state that the rod and the sensing element are fixed.

In the above configuration, the sleeve or the rod is fixed to the sensing element by soldering, for example, and thus the contact probe and the sensing element are inseparably connected, which further improves the reliability of the connection between the contact probe 30 and the sensing element 10.

In the aforementioned pressure sensor for the vehicle, a plurality of the contact probes may be provided at a top end surface of the sensor housing, and at least one of the contact probes may be disposed in such a manner that a distance from the at least one contact probe to a center point of the top end surface differs from distances from the other contact probes to the center point of the top end surface.

In the above configuration, because at least one of the contact probes is disposed at a position of which distance to the center point of the top end surface is different from those of the other contact probes, the direction of the pressure sensor for the vehicle can be judged based on the positions of the contact probes. Thus, when the pressure sensor for the vehicle is installed on the vehicle, the direction of the pressure sensor can be easily determined, which allows to improve the workability of installing the pressure sensor.

When the pressure sensor for the vehicle is installed on the vehicle in wrong direction, the contact probes and the connection parts of the electronic control unit are not properly positioned, which causes failure in connection of the contact probes and the connection part of the electronic control unit. Thus, wrong installation of the pressure sensor can be easily detected.

A second aspect of the present invention provides a brake fluid pressure control apparatus for a vehicle equipped with the aforementioned pressure sensor for the vehicle, including the fluid passage for connecting a master cylinder to wheel brakes; and a control unit for controlling the pressure of the fluid applied to the wheel brakes based on the pressure of the fluid measured by the sensing element of the pressure sensor for the vehicle.

In the above configuration, because the brake fluid pressure control apparatus for the vehicle is equipped with the pressure sensor of the present invention, the reliability of the connection between the contact probe and the sensing element can be improved, and the electrical contact resistance between the contact probe and the sensing element can be also prevented from being increased, which improves the reliability of the control of the brake fluid pressure control apparatus for the vehicle. The cost incurred for the pressure sensor for the vehicle can be also reduced, which achieves low production cost of the brake fluid pressure control apparatus for the vehicle.

1. In accordance with the pressure sensor for the vehicle of the present invention, it is possible to prevent contamination from being generated between the contact probe and the sensing element that may be caused by influence of the environment around the pressure sensor or the slide of the contact probe, which allows to improve the reliability of the connection in the long term. Furthermore, the electrical contact resistance between the contact probe and the sensing element can be prevented from being increased. Moreover, the position of the contact probe can be easily determined when assembling the contact probe into the sensor housing. Thus, workability of assembling the contact probe into the sensor housing can be improved, which achieves low production cost of the pressure sensor.

In accordance with the brake fluid pressure control apparatus for the vehicle equipped with the pressure sensor, the reliability of the connection between the contact probe and the sensing element can be improved. Furthermore, the electrical contact resistance between the contact probe and the sensing element can be also prevented from being increased, which improves the reliability of the control of the brake fluid pressure control apparatus for the vehicle. The cost incurred for the pressure sensor for the vehicle can be also reduced, which achieves low production cost of the brake fluid pressure control apparatus for the vehicle.

Other features and advantages of the present invention will become more apparent from the following detailed descriptions of the invention when taken in conjunction with the accompanying drawings.

DETAILED DESCRIPTION OF THE INVENTION

Figure 1:
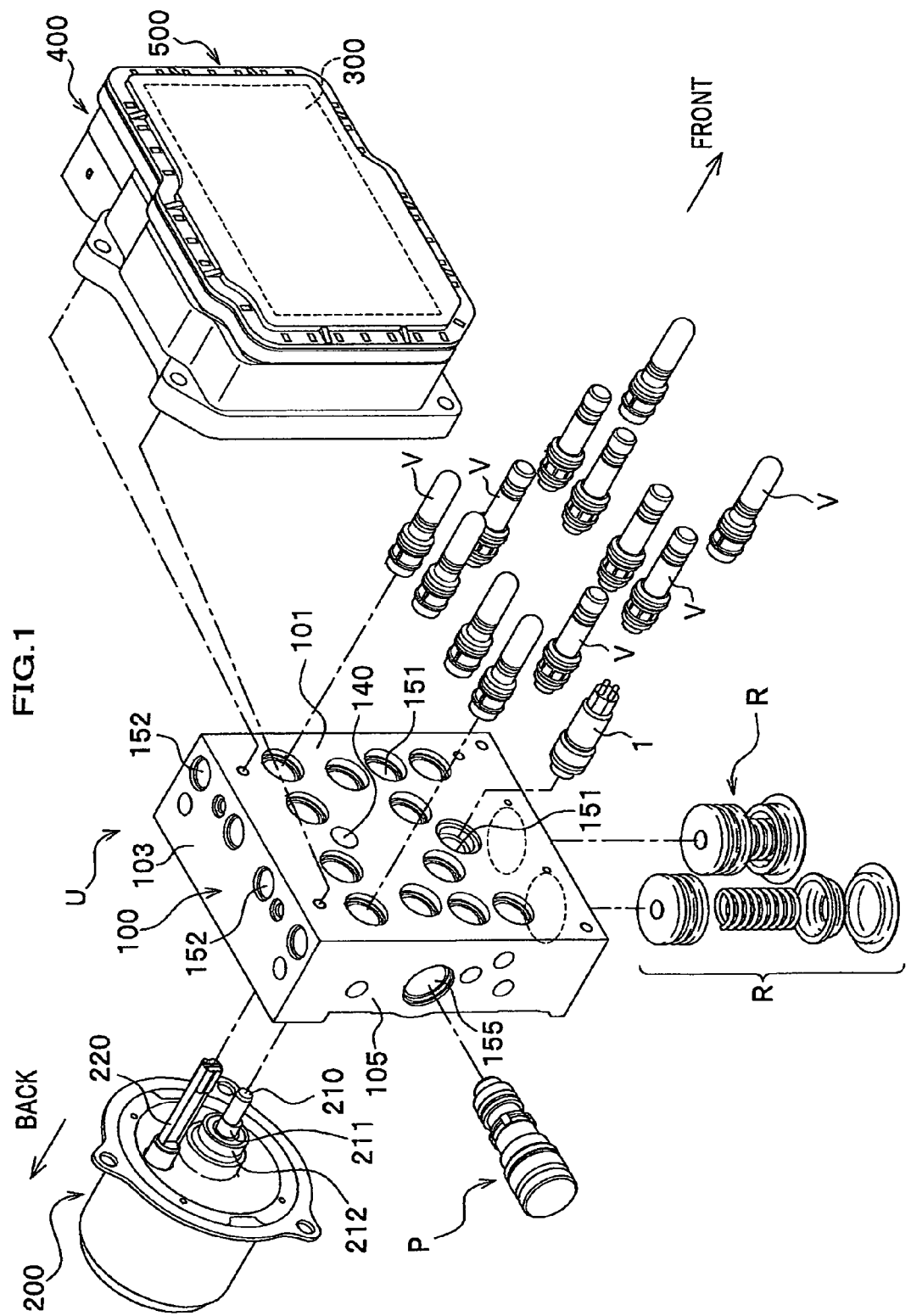
FIG. 1 is an exploded perspective view of a brake fluid pressure control apparatus for a vehicle equipped with a pressure sensor according to an embodiment.

Embodiment of the invention is described in detail below with reference to the accompanying drawings. For describing the embodiment, the explanation below uses as an example a pressure sensor installed in a brake fluid pressure control apparatus for a vehicle that can perform anti-lock control, traction control and the like.

<Configuration of Brake Fluid Control Apparatus for Vehicle>

The configuration of a brake fluid control apparatus for a vehicle U is described below with reference to FIG. 1. The brake fluid control apparatus for a vehicle U includes a base 100 on which electrical parts, such as electromagnetic valves V and a pressure sensor 1, and a reciprocating pump P are mounted, a motor 200 which is the power source of the reciprocating pump P, an electronic control unit 300 that controls opening and closing of the electromagnetic valves V and the operation of the motor 200, a housing 400 that accommodates the electrical parts protruding from the base 100 and the electronic control unit 300, and a cover 500 that covers the opening of the housing 400. The electronic control unit 300 may also be referred to as a control unit.

<Configuration of Base>

The base 100 is made of metallic material formed in substantially rectangular parallelepiped shape and includes fluid passages (oil passages) for brake fluid inside thereof. Formed on a front surface 101 of the base 100 are closed-end mounting holes 151 into which electrical parts such as the electromagnetic valves V and the pressure sensor 1 are mounted. An upper surface 103 of the base 100 is provided with four exit ports to which pipes to wheel brakes (not shown) are connected. The bottom surface of the base 100 includes reserver holes (not shown) into which reserver components R constituting a reserver are mounted. The side surface 105 of the base 100 is provided with a pump hole 155 into which the reciprocating pump P is mounted. The holes formed on the base 100 are communicated with one another directly or via the passages (not shown) formed inside of the base 100.

<Configuration of Motor>

The motor 200 is a power source of the reciprocating pump P and is integrally fixed to a back surface 102 of the base 100 as shown in FIG. 1. An endless seal member 214 is interposed between the motor 200 and the back surface 102 of the base 100 to fluid-tightly seal between the motor 200 and the back surface 102.

An output axis 210 of the motor 200 is provided with an eccentric shaft 211, and the ball bearings 212 are fit into the eccentric shaft 211. The eccentric shaft 211 and the ball bearings 212 are inserted into a motor mounting hole 154. The motor 200 includes a motor bus bar 220 for providing electricity to a rotor (not shown) above the output axis 210. The motor bus bar 220 is inserted through a terminal hole 140 and is connected to a terminal 8b of the housing 400.

<Configuration of Electronic Control Unit>

The electronic control unit 300 is made by mounting semiconductor chips on a substrate 301 on which electronic circuits (conductive member) are printed, and is configured to control opening and closing of the electromagnetic valves V and the operation of the motor 200 based on information obtained through various types of sensors such as the pressure sensor 1, wheel speed sensors (not shown) and programs that are stored in advance.

Figure 4:
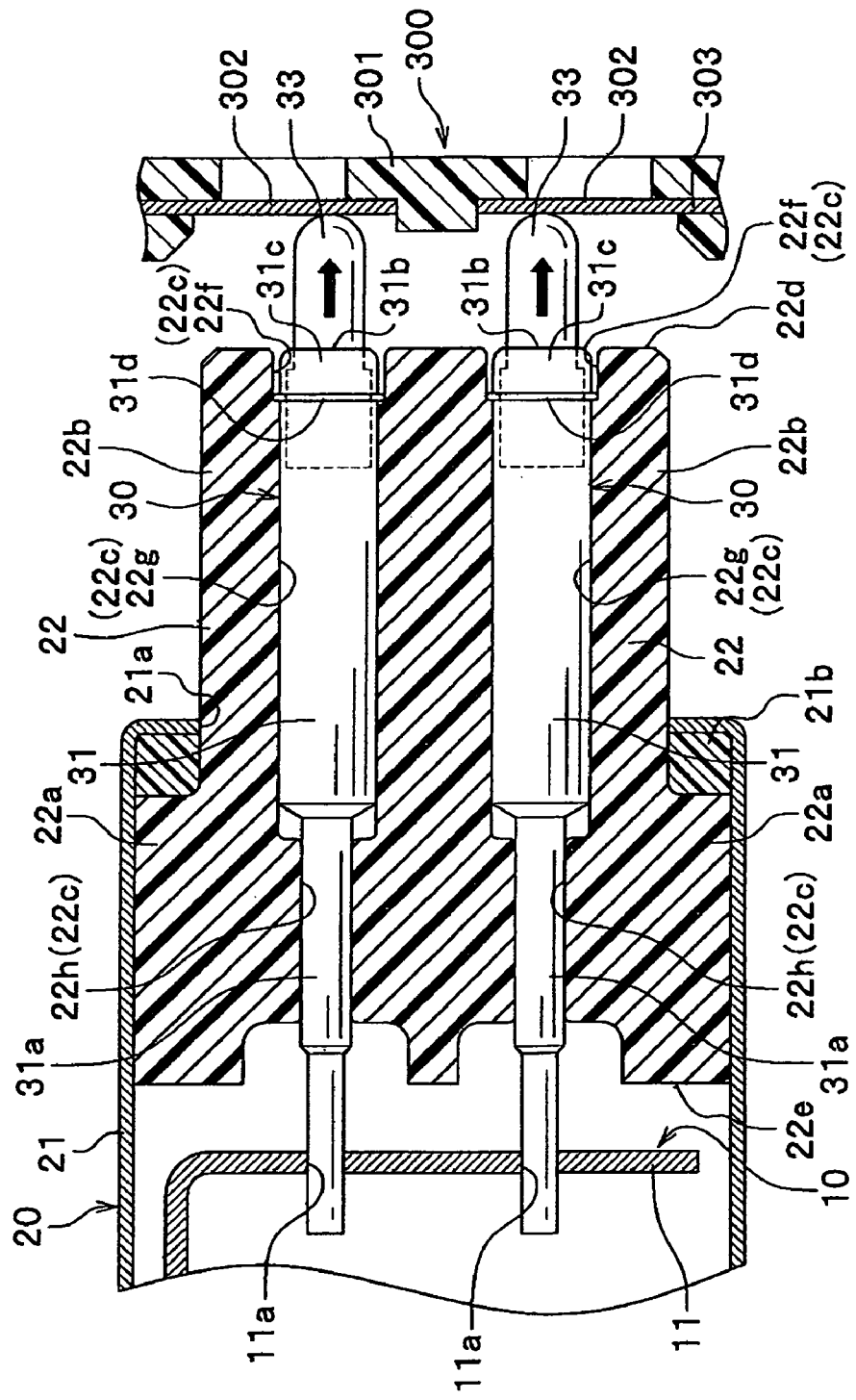
FIG. 4 is an enlarged sectional view of a part of the pressure sensor according to the embodiment.

Connected to the electronic circuit of the substrate 301 is a conductive member 303 embedded in the housing 400. The conductive member 303 is provided in a partition 401 that is formed closer to the base 100 than the substrate 301 in the housing 400 and extends along the partition 401. As shown in FIG. 4, the conductive member 303 includes a connection part 302 that is exposed to the side of the partition 401 that is opposed to the base 100. When the contact probe 30 of the pressure sensor 1 comes in contact with the connection part 302, the pressure sensor 1 and the electronic control unit 300 are electrically connected.

<Configuration of Housing>

Figure 2:
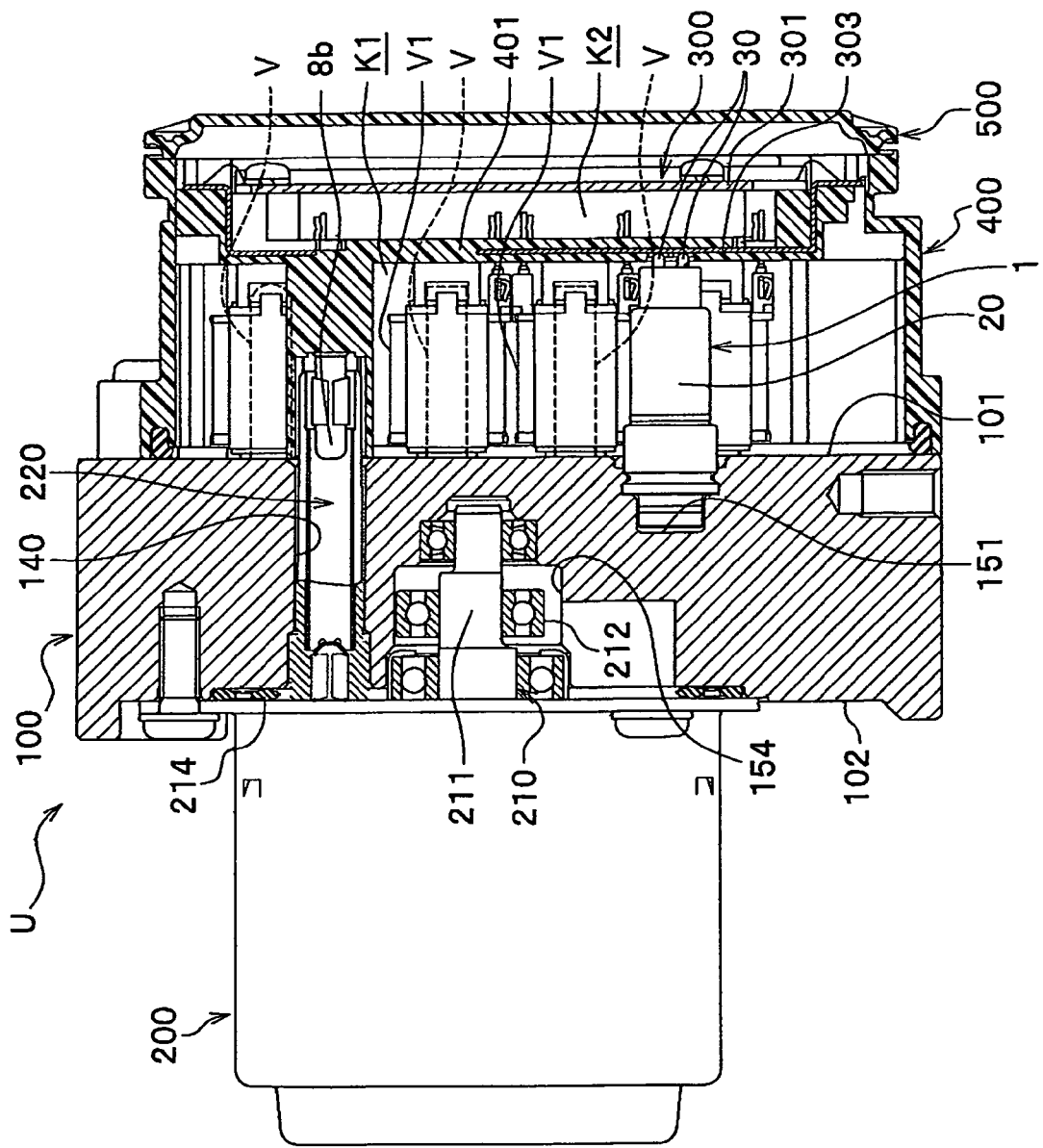
FIG. 2 is a sectional slide view of the brake fluid pressure control apparatus for a vehicle equipped with the pressure sensor according to the embodiment.

The housing 400 shown in FIG. 1 covers the electrical parts, such as the electromagnetic valves V and the pressure sensor 1, which protrude from the front surface 101 of the base 100, and is integrally fixed to the front surface 101 of the base 100. The housing 400 also includes a first space K1 and a second space K2 as shown in FIG. 2.

The first space K1 receives the electrical parts such as the electromagnetic valves V, electromagnetic coils V1 and the pressure sensor 1. The second space K2 accommodates the electronic control unit 300. The housing 400 is formed of a thermoplastic synthetic resin such as polybutylene terephthalate (PBT).

<Configuration of Cover>

The cover 500 of the housing 400 covers and seals the opening of the front surface (the surface on the side of the second space K2) of the housing 400 and is fixed to the front surface edges of the housing 400 by welding, adhesion or the like. The cover 500 is also formed of a thermoplastic synthetic resin such as polybutylene terephthalate (PBT).

<Configuration of Pressure Sensor>

The pressure sensor 1 shown in FIG. 2 is an electrical unit for measuring the pressure of the brake fluid in the fluid passages formed in the base 100. The pressure sensor 1 is mounted on the front surface 101 of the base 100 by inserting its base end (the end on the side of the base 100) into the mounting hole 151 formed on the front surface 101 of the base 100.

Figure 3A:
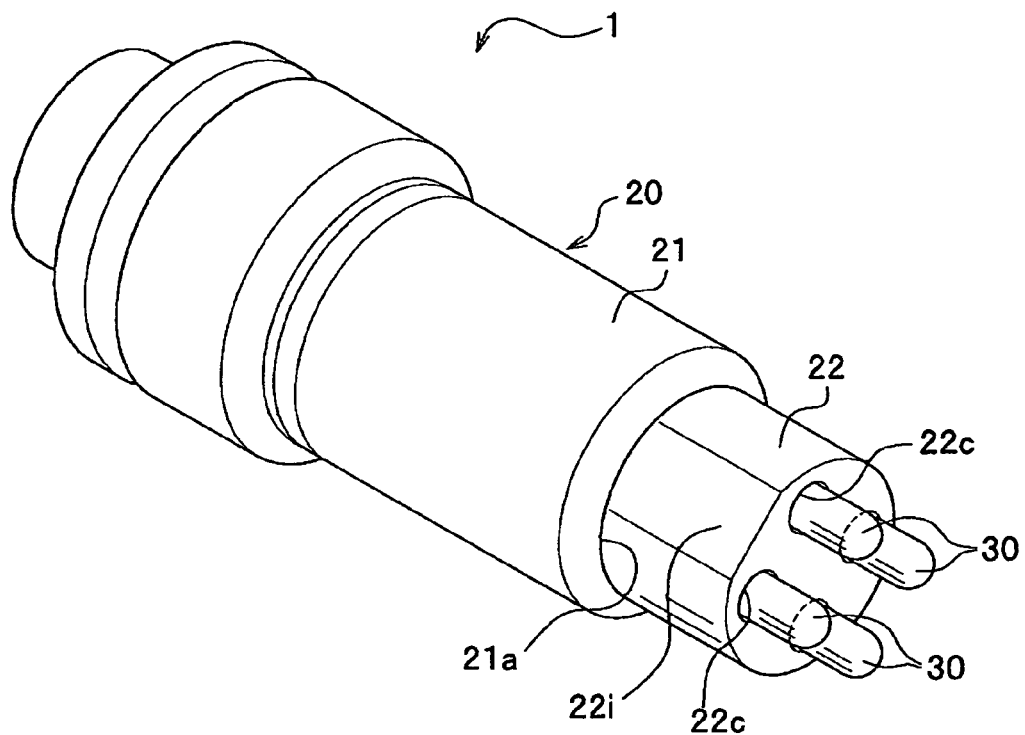
FIG. 3A is a perspective view of the pressure sensor according to the embodiment.

As shown in FIG. 3A, the pressure sensor 1 includes a sensing element 10 (refer to FIG. 4) for measuring the pressure of the brake fluid in the fluid passages, the sensor housing 20 for accommodating the sensing element 10 and the contact probe 30 that is electrically connected to the sensing element 10 at one end thereof and is electrically connected to the electronic control unit 300 at the other end thereof (refer to FIG. 2).

<Configuration of Sensor Housing>

The sensor housing 20 includes a housing part 21 made of a metallic material formed in closed-end cylinder shape and a supporting member 22 made of resin material that is circular form in cross-section and is inserted into the housing part 21 through a top end opening 21a of the housing part 21.

The supporting member 22 includes a large diameter portion 22a inserted in the housing part 21 and a small diameter portion 22b that protrudes outside through the top end opening 21a of the housing part 21 as shown in FIG. 4.

A ring 21b is fit into the part of the small diameter portion 22b that is disposed in the housing part 21 to prevent from generating a gap between the small diameter portion 22b and the housing part 21, which may be generated from the dimension error of the small diameter portion 22b and the housing part 21.

As shown in FIG. 3A, a cut-out 22i is formed on a part of the outer circumferential surface of the small diameter portion 22b. When mounting the pressure sensor 1 into the mounting hole 151 formed on the front surface 101 of the base 100 shown in FIG. 1, the position of the pressure sensor 1 can be easily determined by holding the cut-out 22*i* of the supporting member 22 of the pressure sensor 1 in FIG. 3A by a jig (not shown), whereby the connection part 302 of the conductive member 303 connected to the electronic circuit of the substrate 301 in FIG. 2 and the contact probe 30 of the pressure sensor 1 can be made into contact with each other with high reliability.

Figure 3B:
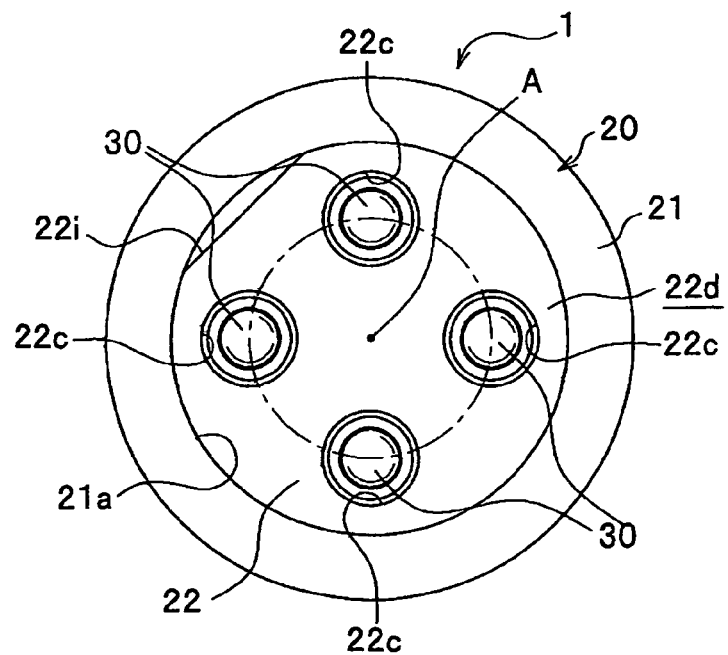
FIG. 3B is a view of the pressure sensor according to the embodiment seen from the side of contact probes.

The supporting member 22 includes four insertion holes 22*c*, each of which penetrates through the supporting member 22 in the axial direction thereof (refer FIG. 4) as shown in FIG. 3B. Each insertion hole 22*c* is formed on the circumference of a circle of which center is a center point A of the top end surface 22*d* of the supporting member 22 at every 90-degree angular interval. In other words, the distance between each insertion hole 22*c* and the center of the top end surface 22*d* of the supporting member 22 (i.e. radius) is the same.

Each insertion hole 22*c* includes a front portion 22*f*, a middle portion 22*g* and a back portion 22*h* in order from the top end surface 22*d* of the supporting member 22 toward a base end surface 22*e* as shown in FIG. 4.

A sleeve 31 of the contact probe 30, which is described later, is press-fit into the middle portion 22*g* and the back portion 22*h*, and thus the diameter of the back portion 22*h* is made smaller than that of the middle portion 22*g* to correspond to the outer diameter of a protruding portion 31*a* of the sleeve 31.

The diameter of the front portion 22*f* is made larger than that of the middle portion 22*g* to generate space between the inner circumferential surface of the front portion 22*f* and the outer circumferential surface of the sleeve 31 when the contact probe 30 is inserted into the insertion hole 22*c*.

<Configuration of Sensing Element>

The sensing element 10 is accommodated in the housing part 21 and measures the pressure of the brake fluid in the fluid passages. The sensing element 10 further converts the measured pressure value into an electric signal and outputs the electric signal. In the embodiment, the configuration of the sensing element 10 employs the configuration that has been widely known, and thus the detailed description thereof will be omitted.

The sensing element 10 of the embodiment includes a substrate 11 disposed on a position opposed to the base end surface 22*e* of the supporting member 22. An electronic circuit (conductive member) is printed on the substrate 11, and semiconductor chips are also mounted on the substrate 11.

Four connection holes 11*a* (only two of them are shown in FIG. 4) are formed in the substrate 11. Each connection hole 11*a* is conducted to an electronic circuit. The connection hole 11*a* is an electrical connection portion that electrically connects the contact probe 30 with the electronic circuit when the protruding portion 31*a* of the contact probe 30 is inserted through the connection hole 11*a* and is made into contact with the connection hole 11*a*. In this embodiment, the protruding portion 31*a* of the contact probe 30 and the connection hole 11*a* of the substrate 11 are fixed by soldering on a base end surface of the substrate 11.

<Configuration of Contact Probe>

Figure 5:
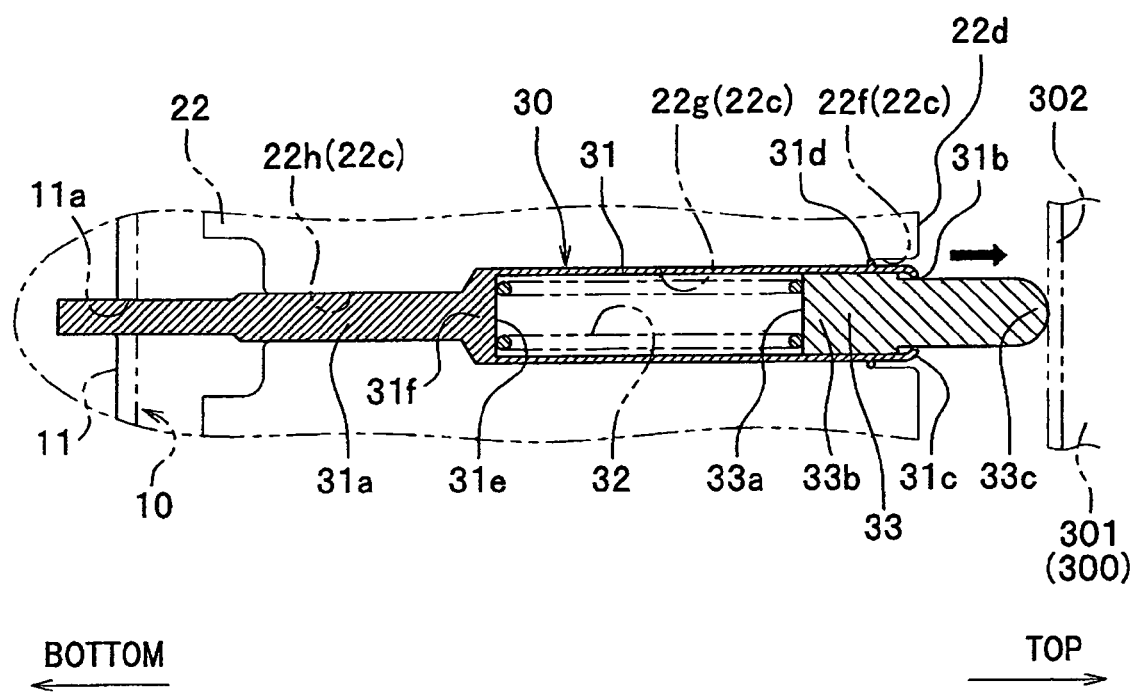
FIG. 5 is a sectional slide view of a contact probe provided for the pressure sensor according to the embodiment.

The contact probe 30 includes the sleeve 31 that is made of metallic material formed in closed-end cylinder shape, a coil spring 32 that is an elastic member housed in the sleeve 31 and a rod 33 that is made of metallic material and is inserted into the sleeve 31 as shown in FIG. 5.

An opening is formed on the front end (the end on the side of the electronic control unit 300) of the sleeve 31, and the rod 33 is inserted into the opening. A diameter shrunk portion 31*c* for preventing the rod 33 from slipping off is formed at the opening edge 31*b* of the sleeve 31. The diameter shrunk portion 31*c* is formed by calking the opening edge 31*b* after the rod 33 is inserted into the sleeve 31.

A stopper flange 31*d* is formed around the outer circumferential surface of the sleeve 31 in a protruding condition. The distance between the stopper flange 31*d* and the opening edge 31*b* of the sleeve 31 is designed to be the same as the depth of the front portion 22*f* of the insertion hole 22*c* of the supporting member 22.

Therefore, when the contact probe 30 is inserted into the insertion hole 22*c* from the front portion 22*f* until the stopper flange 31*d* is abutted to the step between the front portion 22*f* of the insertion hole 22*c* and the middle portion 22*g* of the insertion hole 22*c*, the opening edge of the insertion hole 22*c* is arranged around the opening edge 31*b* of the sleeve 31. In other words, the inner circumferential surface of the front portion 22*f* of the insertion hole 22*c* is a wall that surrounds the diameter shrunk portion 31*c* in the embodiment.

A rod-shaped protruding portion 31*a* protruding backward (toward the side of the sensing element 10) is formed on the bottom portion 31*f* of the sleeve 31.

The diameter of the protruding portion 31*a* of the sleeve 31 is designed smaller than that of the bottom portion 31*f* of the sleeve 31. When the contact probe 30 is inserted into the insertion hole 22*c*, the protruding portion 31*a* is inserted through the back portion 22*h*, and the bottom end of the protruding portion 31*a* protrudes from the base end surface 22*e* of the supporting member 22 and is further inserted through the connection hole 11*a* of the substrate 11 of the sensing element 10.

The coil spring 32 is housed in the sleeve 31 in a compressed state. The front end of the coil spring 32 is in contact with a rear surface 33*a* of the rod 33, and the rear end thereof is in contact with a bottom surface 31*e* of the sleeve 31.

The rod 33 is pressed by pressing force of the coil spring 32 in the direction in which the rod 33 protrudes from the sleeve 31 (the direction toward the right side of FIG. 5). The rod 33 includes a large diameter potion 33*b* that is slidably inserted into the sleeve 31 and a small diameter portion 33*c* that protrudes outside from the opening of the sleeve 31. The step between the large diameter portion 33*b* and the small diameter portion 33*c* is engaged with the diameter shrunk portion 31*c* of the sleeve 31 so that the rod 33 is prevented from slipping off from the sleeve 31.

As shown in FIG. 4, when the contact probe 30 is inserted into the insertion hole 22*c* of the supporting member 22, the sleeve 31 is press-fit into the middle portion 22*g* and the back portion 22*h* of the insertion holes 22*c*, whereby the contact probe 30 is fixed in the insertion holes 22*c*. The protruding portion 31*a* of the sleeve 31 protrudes from the base end surface 22*e* of the supporting member 22 and is further inserted through the connection hole 11*a* of the substrate 11 of the sensing element 10. The protruding portion 31*a* and the connection hole 11*a* are fixed by soldering. Thus, the contact probe 30 and the sensing element 10 are electrically connected.

<Assembly Process of Contact Probe>

The process of assembling the contact probe 30 into the supporting member 22 of the sensor housing 20 is described below.

First, the contact probe 30 is inserted into the insertion hole 22*c* from the top end surface 22*d* of the supporting member 22 as shown in FIG. 4. When the stopper flange 31*d* of the contact probe 30 is abutted to the step between the front portion 22*f* and the middle portion 22*g* of the insertion hole 22c, the position of the contact probe 30 is fixed in the insertion hole 22c. At this time, the sleeve 31 of the contact probe 30 is press-fit into the insertion hole 22c, and thus the contact probe 30 is fixed in the sensor housing 20.

When the contact probe 30 is inserted into the insertion hole 22c of the supporting member 22, the protruding portion 31a of the sleeve 31 is inserted through the connection hole 11a of the substrate 11 of the sensing element 10, whereby the contact probe 30 and the sensing element 10 are electrically connected.

Further, the protruding portion 31a of the contact probe 30 and the connection hole 11a of the substrate 11 are fixed by soldering from the side of the housing part 21.

When the base end portion of the pressure sensor 1 is inserted into the mounting hole 151 of the base 100 as shown in FIG. 2 and the housing 400 is fixed to the front surface 101 of the base 100, the rod 33 of the contact probe 30 is pressed toward the connection part 302 of the electronic control unit 300 by the pressing force of the coil spring 32 (see FIG. 5) as shown in FIG. 4. Thus, the contact probe 30 and the electronic control unit 300 are electrically connected.

<Advantages of Pressure Sensor and Brake Fluid Pressure Control Apparatus for Vehicle>

In the pressure sensor 1, because the sleeve 31 connected to the sensing element 10 is stably fixed to the sensor housing 20 as shown in FIG. 4, it is possible to prevent contamination from being generated between the contact probe 30 and the sensing element 10 that may be caused by influence of the environment around the pressure sensor 1 or the slide of the contact probe 30, which allows to improve the reliability of the connection in the long term.

Furthermore, because the sleeve 31 is stably connected to the sensing element 10, the electrical contact resistance between the contact probe 30 and the sensing element 10 can be prevented from being increased.

Moreover, because the sleeve 31 connected to the sensing element 10 is stably fixed to the supporting member 22 of the sensor housing 20, the position of the contact probe 30 can be easily determined when fixing the contact probe 30 to the sensor housing 20. Thus, workability of fixing the contact probe 30 to the sensor housing 20 can be improved, which achieves low production cost of the pressure sensor 1.

In the brake fluid pressure control apparatus for a vehicle U equipped with the pressure sensor 1 (see FIG. 1), the reliability of the connection between the contact probe 30 and the sensing element 10 can be improved. The electrical contact resistance between the contact probe 30 and the sensing element 10 can be also prevented from being increased, which improves the reliability of the control of the brake fluid pressure control apparatus for a vehicle U.

The cost incurred for the pressure sensor 1 can be also reduced, which achieves low production cost of the brake fluid pressure control apparatus for a vehicle U.

In the pressure sensor 1, the sleeve 31 is fixed to the connection hole 11a of the substrate 11 of the sensing element 10 by soldering, and thus the contact probe 30 and the sensing element 10 are inseparably connected, which further improves the reliability of the connection between the contact probe 30 and the sensing element 10.

In the pressure sensor 1, the sleeve 31 is press-fit into the insertion hole 22c of the supporting member 22, which allows to fix the contact probe 30 in the sensor housing 20 easily.

In the pressure sensor 1, the wall (the inner circumferential surface of the front portion 22f of the insertion hole 22c) surrounding the diameter shrunk portion 31c of the sleeve 31 is formed, and thus an external member hardly comes into contact with the diameter shrunk portion 31c of the sleeve 31 when handling the pressure sensor 1, whereby the contact probe 30 can be prevented from being damaged, which results in easy handling of the pressure sensor 1

<Another Embodiment>

The embodiment of the present invention is described as above, however, the present invention is not limited to the embodiment and may be modified as appropriate without deviating from the scope of the invention.

Figure 6:
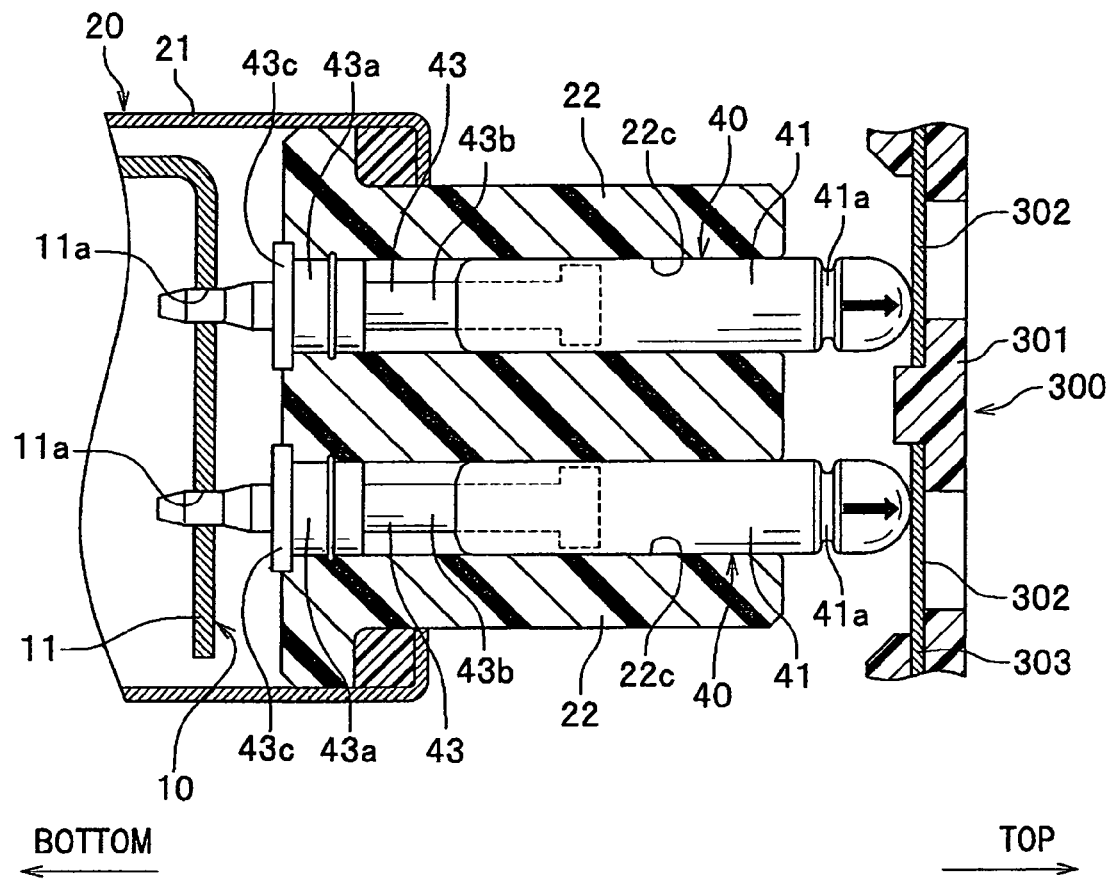
FIG. 6 is an enlarged sectional view of a part of a pressure sensor according to another embodiment.

The contact probe 30 of the sleeve 31 is connected to the sensing element 10 and the rod 33 is connected to the electronic control unit 300 in the embodiment as shown in FIG. 4, however, the pressure sensor may be configured in such a manner that a rod 43 is connected to the sensing element 10 and the sleeve 41 is connected to the electronic control unit 300 as shown in FIG. 6 for example.

The rod 43 described in the another embodiment above includes a press-in portion 43a that is press-fit into the insertion holes 22c and a shaft part 43b extending toward the sleeve 41 from the press-in portion 43a. The diameter of the top end of the shaft part 43b (the end on the side of the sleeve 41) is made larger, and the top end of the shaft part 43b is slidable in the sleeve 41.

Figure 7:
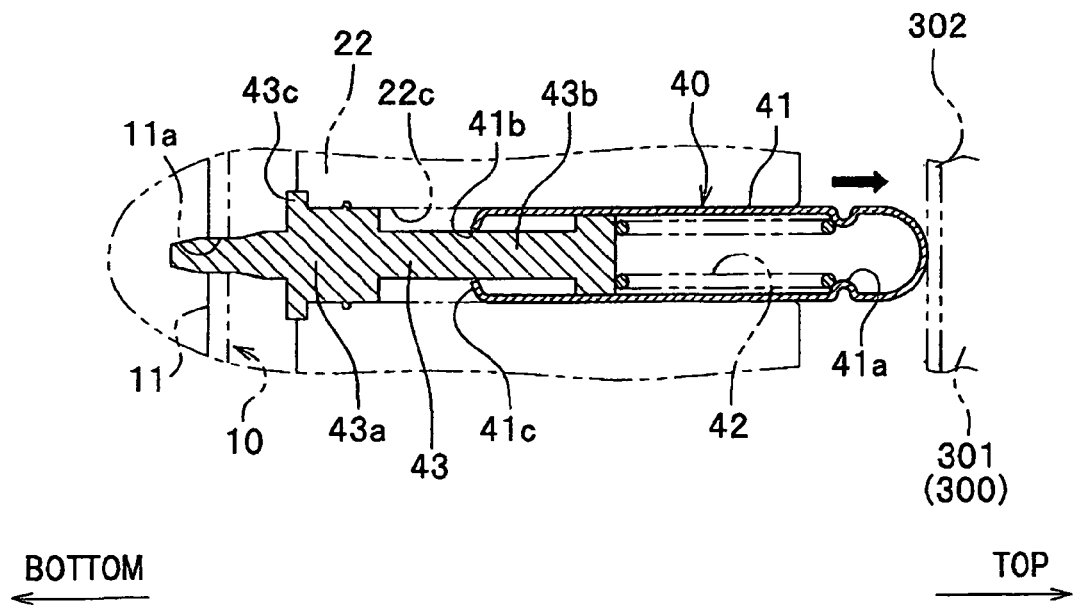
FIG. 7 is a sectional slide view of a contact probe provided for the pressure sensor according to the another embodiment.

The sleeve 41 is slidably inserted into the insertion hole 22c. A coil spring 42 is housed in the sleeve 41 in a compressed state as shown in FIG. 7. An end of the coil spring 42 is locked to a protrusion 41a formed along the inner circumferential surface of the sleeve 41 and the other end thereof is in contact with the front end surface of the rod 43.

A diameter shrunk portion 41c is formed at the opening edge 41b of the sleeve 41. The diameter shrunk portion 41c is formed by calking an opening circumferential edge 41b after the rod 43 is inserted into the sleeve 41. The front end of the shaft part 43b of the rod 43 is engaged with the diameter shrunk portion 41c of the sleeve 41 so that the rod 43 is prevented from slipping off from the sleeve 41.

By inserting such a contact probe 40 into the insertion hole 22c from the rear side of the supporting member 22 and abutting a stopper flange 43c formed along the outer circumferential surface of the rod 43 to the opening circumferential edge of the base end surface of the insertion hole 22c as shown in FIG. 6, the position of the contact probe 40 is determined in the insertion holes 22c.

When the contact probe 40 is inserted into the sensor housing 20, the rod 43 is also inserted through the connection hole 11a of the substrate 11 of the sensing element 10, whereby the contact probe 40 and the sensing element 10 are electrically connected.

When the pressure sensor including the contact probe 40 is installed on the base and the housing is fixed to the base, the sleeve 41 is pressed toward the connection part 302 of the electronic control unit 300 by pressing force of the coil spring 42, whereby the contact probe 40 and the electronic control unit 300 are electrically connected.

In the pressure sensor according to the another embodiment, the rod 43 connected to the sensing element 10 is stably fixed to the supporting member 22 of the sensor housing 20, which allows to easily determine the position of the contact probe 40 when assembling the contact probe 40 in the sensor housing 20. Thus, workability of assembling the contact probe 40 in the sensor housing 20 can be improved, which achieves low production cost of the pressure sensor.

Figure 8:
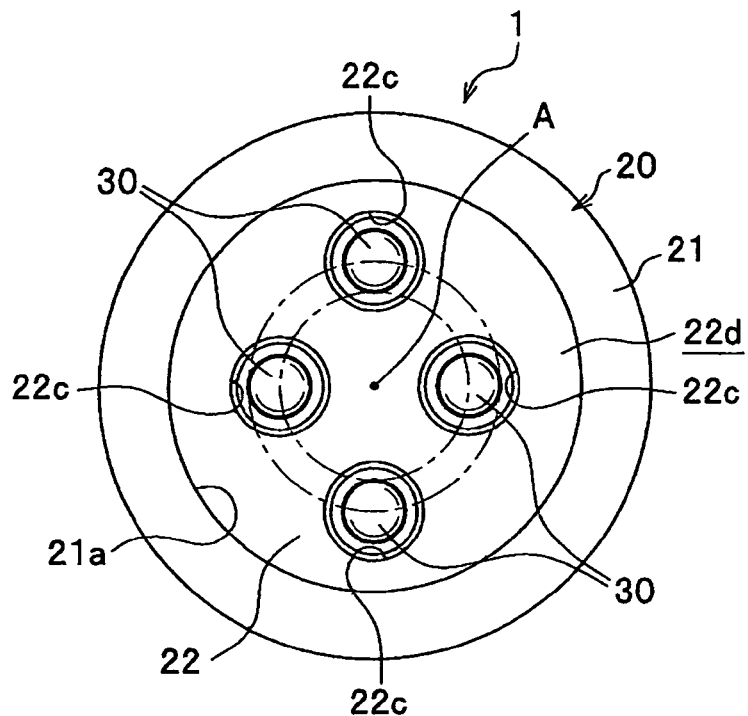
FIG. 8 is a view of the pressure sensor according to the another embodiment seen from the side of the contact probes.
Figure 9:
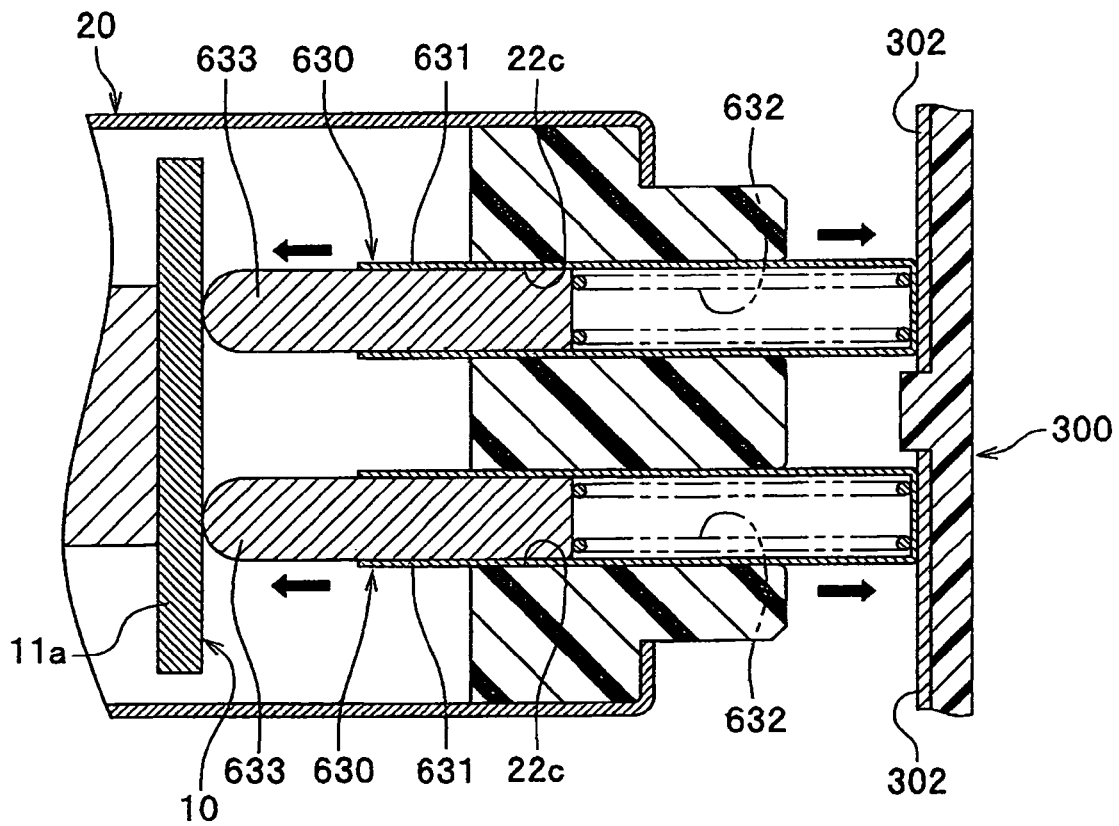
FIG. 9 is an enlarged sectional view of a part of a conventional pressure sensor.

In the embodiment, the four insertion holes 22c formed on the supporting member 22 are disposed on the circumference of the circle of which center is the center point A of the top end surface 22d of the supporting member 22 at every 90-degree angular interval as shown in FIG. 3B, however, the insertion holes 22c may be disposed in such a manner that the distance between each insertion hole 22c and the center point A of the top end surface 22d of the supporting member 22 (i.e. radius) is not the same as shown in FIG. 8. To be more specific, two insertion holes 22c opposed to each other relative to the center point A and the other two insertion holes 22c opposed to each other relative to the center point A are respectively disposed on the circumferences of two circles of which diameters are different. Thus, the four insertion holes 22c are disposed at positions of which distances to the center point A of the top end surface 22d of the supporting member 22 are different.

In the above configuration, because the four contact probes 30 inserted into the insertion holes 22c are disposed at positions of which distances to the center point of the top end surface 22d are different, the direction of the pressure sensor 1 can be judged based on the positions of the contact probes 30. Thus, when the pressure sensor 1 is installed on the base 100 (see FIG. 1), the direction of the pressure sensor 1 can be easily determined, which allows to improve the workability of installing the pressure sensor 1.

When the pressure sensor 1 is installed on the base 100 (see FIG. 1) in wrong direction, the contact probes 30 and the connection parts 302 of the electronic control unit 300 are not properly positioned, which causes failure in connection of the contact probes 30 and the connection part 302 of the electronic control unit 300. Thus, wrong installation of the pressure sensor can be easily detected.

In this embodiment, the protruding portion 31a of the contact probe 30 and the connection hole 11a of the substrate 11 of the sensing element 10 are fixed by soldering as shown in FIG. 4, however, the protruding portion 31a of the contact probe 30 and the connection hole 11a of the substrate 11 of the sensing element 10 may be fixed by means other than soldering as long as the sensing element 10 and the contact probe 30 are securely connected. For example, the contact probe 30 and the sensing element 10 may be electrically connected in a press-fit method in which a press-fit portion of which diameter is made larger than that of the connection hole 11a of the substrate 11 of the sensing element 10 is formed at the protruding portion 31a of the contact probe 30 and the press-fit portion is press-fit into the connection hole 11a of the substrate 11 of the sensing element 10. A press-fit portion whose diameter is smaller than that of the protruding portion 31a may be formed at the connection hole 11a of the substrate 11 of the sensing element 10, and the protruding portion 31a of the contact probe 30 may be press-fit into the connection hole 11a of the substrate 11.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A pressure sensor for a vehicle, comprising:
    a sensing element for measuring a pressure of fluid in a fluid passage;
    a sensor housing for accommodating the sensing element; and
    a contact probe which is electrically connected to the sensing element at one end thereof and is electrically connected to a control unit that is disposed outside of the sensor housing at the other end thereof, the contact probe including a sleeve, an elastic member that is housed in the sleeve, and a rod that is inserted in the sleeve, wherein
    either one of the rod and the sleeve contacts with a connection part of the sensing element in a state that the either one of the rod and the sleeve is fixed in the sensor housing, and
    the other one of the rod and the sleeve is pressed to a connection part of the control unit by pressing force of the elastic member.

2. The pressure sensor for the vehicle according to claim 1, wherein the sleeve is connected to the sensing element and the rod is connected to the control unit, and the sleeve is press-fit into an insertion hole formed in the sensor housing.

3. The pressure sensor for the vehicle according to claim 2, wherein the sleeve is closed-end cylinder and includes a diameter shrunk portion formed at an opening edge of the sleeve to prevent the rod from slipping off, and wherein the sensor housing includes a wall portion that surrounds the diameter shrunk portion.

4. The pressure sensor for the vehicle according to claim 1, wherein the rod is connected to the sensing element and the sleeve is connected to the control unit, and the rod is press-fit into an insertion hole formed in the sensor housing and the sleeve is slidably inserted into the insertion hole.

5. The pressure sensor for the vehicle according to claim 2, wherein the sleeve and the sensing element are connected in a state that the sleeve and the sensing element are fixed.

6. The pressure sensor for the vehicle according to claim 4, wherein the rod and the sensing element are connected in a state that the rod and the sensing element are fixed.

7. The pressure sensor for the vehicle according to claim 1, wherein a plurality of the contact probes is provided at a top end surface of the sensor housing, and at least one of the contact probes is disposed in such a manner that a distance from the at least one contact probe to a center point of the top end surface of the sensor housing differs from distances from the other contact probes to the center point of the top end surface of the sensor housing.

8. A brake fluid pressure control apparatus for a vehicle equipped with the pressure sensor for the vehicle according to claim 1, comprising:
    the fluid passage for connecting a master cylinder to wheel brakes;
    a control unit for controlling a pressure of brake fluid applied to the wheel brakes based on the pressure of the brake fluid measured by the sensing element of the pressure sensor for the vehicle.

9. A brake fluid pressure control apparatus for a vehicle equipped with a pressure sensor for a vehicle comprising:
    a sensing element for measuring a pressure of fluid in a fluid passage;
    a sensor housing for accommodating the sensing element; and
    a contact probe which is electrically connected to the sensing element at one end thereof and is electrically connected to a control unit that is disposed outside of the sensor housing at the other end thereof, the contact probe including a sleeve, an elastic member that is housed in the sleeve, and a rod that is inserted in the sleeve, wherein
    either one of the rod and the sleeve contacts with a connection part of the sensing element in a state that the either one of the rod and the sleeve is fixed in the sensor housing, and the other one of the rod and the sleeve is pressed to a connection part of the control unit by pressing force of the elastic member,
    the brake fluid pressure control apparatus for the vehicle comprising:
    the fluid passage for connecting a master cylinder to wheel brakes;
    a control unit for controlling a pressure of brake fluid applied to the wheel brakes based on the pressure of the brake fluid measured by the sensing element of the pressure sensor for the vehicle.

* * * * *